United States Patent
Camilo Gamboa Higuera et al.

(10) Patent No.: US 11,501,167 B2
(45) Date of Patent: Nov. 15, 2022

(54) LEARNING DOMAIN RANDOMIZATION DISTRIBUTIONS FOR TRANSFER LEARNING

(71) Applicants: Juan Camilo Gamboa Higuera, Montreal (CA); Melissa Mozifian, Montreal (CA); David Meger, Montreal (CA); Elmira Amirloo Abolfathi, North York (CA)

(72) Inventors: Juan Camilo Gamboa Higuera, Montreal (CA); Melissa Mozifian, Montreal (CA); David Meger, Montreal (CA); Elmira Amirloo Abolfathi, North York (CA)

(73) Assignees: HUAWEI TECHNOLOGIES CANADA CO., LTD., Ottawa (CA); THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 343 days.

(21) Appl. No.: 16/890,981

(22) Filed: Jun. 2, 2020

(65) Prior Publication Data

US 2021/0097386 A1 Apr. 1, 2021

Related U.S. Application Data

(60) Provisional application No. 62/839,599, filed on Apr. 26, 2019.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
USPC ......................................... 706/25, 12, 15, 16
See application file for complete search history.

(56) References Cited

U.S. PATENT DOCUMENTS

2019/0250568 A1* 8/2019 Li ............................ G06N 3/08
2020/0320435 A1* 10/2020 Sequeira ................ G06N 3/006

OTHER PUBLICATIONS

Jakobi, N. et al., "Noise and The Reality Gap: The Use of Simulation in Evolutionary Robotics", European Conference on Artificial Life, Springer, 1995, pp. 704-720.
Peng, X. B. et al., "Sim-to-Real Transfer of Robotic Control with Dynamics Randomization", 2018 IEEE International Conference on Robotics and Automation (ICRA), IEEE, 2018, pp. 1-8.
Andrychowicz, M. et al., "Learning Dexterous In-Hand Manipulation", arXiv preprint arXiv: 1808.00177, 2018.
Chen, T. et al., "Hardware Conditioned Policies for Multi-Robot Transfer Learning", Advances in Neural Information Processing Systems, 2018, pp. 9355-9366.
(Continued)

*Primary Examiner* — Thjuan K Addy

(57) ABSTRACT

Method or system for reinforcement learning that simultaneously learns a DR distribution $\phi$ while optimizing an agent policy $\Pi$ to maximize performance over the learned DR distribution; method or system for training a learning agent using data synthesized by a simulator based on both a performance of the learning agent and a range of parameters present in the synthesized data.

19 Claims, 5 Drawing Sheets

(56) References Cited

OTHER PUBLICATIONS

Rajeswaran, A. et al., "EPOpt: Learning Robust Neural Network Policies Using Model Ensembles", CoRR, vol. abs/1610.01283,2016. [Online]. Available: http://arxiv.org/abs/1610.01283.
Packer, C. et al., "Assessing Generalization in Deep Reinforcement Learning", arXiv preprint arXiv:1810.12282, 2018.
Chebotar, Y. et al., "Closing the Sim-to-Real Loop: Adapting Simulation Randomization with Real World Experience", arXiv preprint arXiv:1810.05687, 2018.
Ramos, F. et al., "BayesSim: Adaptive Domain Randomization via Probabilistic Inference for Robotics Simulators", Proceedings of Robotics: Science and Systems, Freiburg im Breisgau, Germany, Jun. 2019.
Brockman G. et al., "OpenAI Gym", arXiv:1606.01540v1 [cs.LG] Jun. 5, 2016.
Zames, G., "Feedback and Optimal Sensitivity: Model Reference Transformations, Multiplicative Seminorms, and Approximate Inverses", IEEE Transactions on Automatic Control, vol. 26, No. 2, pp. 301-320, Apr. 1981.
Caruana, R., "Multitask Learning: A Knowledge-Based Source of Inductive Bias", Proceedings of the Tenth International Conference on Machine Learning, Morgan Kaufmann, 1993, pp. 41-48.
Baxter, J., "A Bayesian/Information Theoretic Model of Learning to Learn via Multiple Task Sampling", Machine Learning, vol. 28, No. 1, pp. 7-39, Jul. 1997 [Online] Available: https://doi.org/10.1023/A:1007327622663.
Tamar, A. et al., "Optimizing the CVaR via Sampling", Twenty-Ninth AAAI Conference on Artificial Intelligence, 2015.
Paul, S. et al., "Contextual Policy Optimisation", CoRR, vol. abs/1805.10662, 2018.
Mehta, B. et al., "Active Domain Randomization", CoRR, vol. abs/1904.04762, 2019. [Online], Available: http://arxiv.org/abs/1904.04762.
Yu, W. et al., "Policy Transfer with Strategy Optimization", CoRR, vol. abs/1810.05751, 2018. [Online], Available http://arxiv.org/abs/1810.05751.
Rakelly, K. et al., "Efficient Off-Policy Meta-Reinforcement Learning via Probabilistic Context Variables", arXiv preprint arXiv:1903.08254, 2019.
Yu, W. et al., "Preparing for the Unknown: Learning a Universal Policy with Online System Identification", arXiv preprint arXiv:1702.02453, 2017.
Sutton, R. et al., "Reinforcement Learning: An Introduction", ser. Adaptive Computation and Machine Learning series. MIT Press, 2018 [Online] Available: https://books.google.ca/books?id=6DKPtQEACAAJ.
Schulman, J. et al., "Proximal Policy Optimization Algorithms", arXiv preprint arXiv:1707.06347, 2017.
Fu, M. C., "Gradient Estimation", Handbooks in Operations Research and Management Science, vol. 13, pp. 575-616, 2006.

* cited by examiner

Algorithm 1 Learning the policy and training distribution

Require: testing distribution $p(z)$, initial parameters of the learned distribution $\phi$, initial policy $\pi$, buffer size $B$, total iterations $N$ for $i \in \{1, ..., N\}$ do
   $z \sim p_\phi(z)$
   $s_0 \sim \rho_0(s)$
   $\mathcal{B} = \{\}$
   while $|\mathcal{B}| < B$ do
     $a_t \sim \pi(a_t|s_t, z)$
     $s_{t+1}, r_t \sim p(s_{t+1}, r_t|s_t, a_t, z)$
     append $(s_t, z_k, a_t, r_t, s_{t+1})$ to $\mathcal{B}$
     if $s'$ is terminal then
       $z \sim p_\phi(z)$
       $s_{t+1} \sim \rho_0(s)$
     end if
     $s_t \leftarrow s_{t+1}$
   end while
   $\phi \leftarrow \text{UpdateDistribution}(\phi, p(z), \pi)$
   $\pi \leftarrow \text{UpdatePolicy}(\pi, \mathcal{B})$
end for

FIG. 3A

Algorithm 2 UpdateDistribution

Require: learned distribution parameters $\phi$, testing distribution $p(z)$, policy $\pi$, total iterations $M$, total trajectory samples $K$
    for $i \in \{1, ..., M\}$ do
        sample $z_{1:K}$ from $p(z)$
        Obtain Monte-Carlo estimate of $\mathcal{L}_{DR}(\phi)$ by executing $\pi$ on environments with $z_{1:K}$
        $\phi \leftarrow \phi + \lambda \nabla_\phi (\mathcal{L}_{DR}(\phi) - \alpha D_{KL}(p(z) \| p_\phi(z)))$
    end for

FIG. 3B

LEARNING DOMAIN RANDOMIZATION DISTRIBUTIONS FOR TRANSFER LEARNING

RELATED APPLICATIONS

This application claims benefit of and priority to U.S. Provisional Patent Application No. 62/839,599, "LEARNING DOMAIN RANDOMIZATION DISTRIBUTIONS FOR TRANSFER LEARNING", filed Apr. 26, 2019, the contents of which are incorporated herein by reference.

TECHNICAL FIELD

The present disclosure relates to reinforcement learning, and in particular a method of training of a RL agent in simulation to simultaneously learn a domain randomization (DR) distribution of environmental parameters and an agent policy that maximizes performance of the RL agent in simulation over the learned DR distribution of environmental parameters.

BACKGROUND

Machine learning, and deep reinforcement learning (Deep-RL) in particular, is a promising approach for learning controllers or action policies for complex systems where traditional analytic methods are elusive. In some recent reinforcement learning (RL) systems, neural networks based RL agents are trained to learn respective action policies that can be used to implement real-world controllers. For example, there is interest in using RL agents to synthesize locomotion controllers for robot systems. The data requirements for Deep-RL makes the direct application of RL agents to real robot systems costly, or even infeasible. The use of robot simulators can provide a solution to the data requirements of Deep-RL. However, with the exception of simple robot systems in controlled environments, the experiences faced by real robots operating in real world situations may not correspond to experiences that can be simulated, giving rise to an issue known as the reality gap.

In order to deal with the reality gap, an RL agent can be trained to apply policies that maximize performance over a diverse set of simulation models, where the parameters of each model are sampled randomly. This approach is known as domain randomization (DR). The goal of DR is to address the issue of model misspecification by providing diverse simulated experiences. DR has been demonstrated to effectively produce RL agents that can be trained in simulation with high chance of success on a real robot system after deployment and fine-tuning with real world data. The success of RL agents trained with domain randomization however, is highly dependent on the correct selection of the randomization distribution.

Improved DR selection methods and systems for simulation based training of RL agents are desirable.

SUMMARY

According to a first aspect, the present disclosure provides a method or system for training a learning agent using data synthesized by a simulator based on both a performance of the learning agent and a range of parameters present in the synthesized data. According to a second aspect, the present description provides a method and system for reinforcement learning that simultaneously learns a DR distribution while learning an agent policy to optimize performance over the range of the learned DR distribution.

In at least some applications, the system can provide a trained agent policy (e.g. an agent policy with learned parameters (e.g. weights)) that can be then implemented as a controller in a real world application. The ability to train an agent policy over a range of simulated distributions may in some applications generate a trained agent policy that is better able to handle a wider range of real world situations using fewer training resources. The trained agent policy may be implemented as a neural network that has learned parameters (e.g. weights). The parameters (e.g. weights) of the neural network are learned during training of the agent policy using a reinforcement learning algorithm.

According to one example aspect, a method of learning an agent policy using reinforcement learning is disclosed that includes: performing a set of training iterations, each iteration comprising: generating a set of tuples, the generating of each tuple comprising: sampling a domain randomization (DR) distribution to select an environmental parameter; mapping, using the agent policy, a current observed state and the environmental parameter to a current action; and mapping, using a function, the current action, current observed state and the environmental parameter to a next observed state and a reward, wherein the next observed state is used as the current observed state for generating the next tuple in the set of tuples. Each training iteration also includes updating the DR distribution and the agent policy, based the set of tuples, with an objective of increasing rewards in future iterations.

According to some example aspects of the method, the training iterations are repeated until the earlier of a defined number of training iterations have been performed or the rewards indicate an optimized agent policy and DR distribution have been reached.

According to some example aspects of the above methods, each tuple in the set of tuples includes: the current observed state, the environmental parameter, the current action, the reward, and the next observed state.

According to some example aspects of the above methods, in each training iteration, generating a set of tuples is performed until a predetermined tuple buffer size is reached.

According to some example aspects of the above methods, the DR distribution is defined by distribution parameters, and updating the DR distribution comprises updating the distribution parameters.

According to some example aspects of the above methods, the environmental parameter is a tensor that includes values for a plurality of different parameter types, the DR distribution includes a respective parameter type DR distribution for each of the different parameter types, each parameter type DR distribution being defined by a respective set of distribution parameters.

According to some example aspects of the above methods, at least one of the parameter type DR distributions is a uniform distribution defined by a respective set of distribution parameters that include a minimum value and a maximum value for the uniform distribution.

According to some example aspects of the above methods, the agent policy is implemented by a neural network, and updating the agent policy comprises updating weights applied by the neural network.

According to some example aspects of the above methods, the agent policy is used, after the training iterations, to implement a real-world controller for a robot.

According to a further example aspect there is provided a reinforcement learning (RL) simulator system comprising one or more processing units configured by computer program instructions to simulate an RL agent that is configured to apply an agent policy to map a current observed state and an environmental parameter to a current action, and a simulated environment configured to apply a simulated environment function to map the current action, the current observed state and the environmental parameter to a next observed state and a reward, wherein the computer program instructions configure the one or more processing units to collectively: perform a set of training iterations, each iteration comprising: generating a set of tuples, the generating of each tuple comprising: sampling a domain randomization (DR) distribution to select an environmental parameter; mapping, using the agent policy, a current observed state and the environmental parameter to a current action; and mapping, using the simulated environment function, the current action, current observed state and the environmental parameter to a next observed state and a reward, wherein the next observed state is used as the current observed state for generating the next tuple in the set of tuples. The DR distribution and the agent policy are then updated, based the set of tuples, with an objective of increasing rewards in future iterations.

According to a further example aspect, there is provided a computer program product comprising a non-transitory storage medium storing computer program instructions that, when executed by a processor, configure the processor to: perform a set of training iterations, each iteration comprising: generating a set of tuples, the generating of each tuple comprising: sampling a domain randomization (DR) distribution to select an environmental parameter; mapping, using an agent policy, a current observed state and the environmental parameter to a current action; and mapping, using a function, the current action, current observed state and the environmental parameter to a next observed state and a reward, wherein the next observed state is used as the current observed state for generating the next tuple in the set of tuples. The DR distribution and the agent policy are then updated based the set of tuples, with an objective of increasing rewards in future iterations.

BRIEF DESCRIPTION OF THE DRAWINGS

The present disclosure is made with reference to the accompanying drawings, in which embodiments are shown. However, many different embodiments may be used, and thus the description should not be construed as limited to the embodiments set forth herein. Like numbers refer to like elements throughout, and prime notation is used to indicate similar elements, operations or steps in alternative embodiments.

FIGS. 3A and 3B are pseudo-code representations of an algorithm for implementing the method of FIG. 2.

Similar reference numerals may have been used in different figures to denote similar components.

DESCRIPTION OF EXAMPLE EMBODIMENTS

This specification generally describes a simulator system that learns a DR distribution $\phi$ of environmental parameters while concurrently learning to optimize the performance of an agent policy $\Pi$ over the learned DR distribution. The simulator system learns optimize the performance by maximizing a cumulative reward for solving a task. The agent policy $\Pi$ maps state and an environmental parameter sampled from the learned DR distribution of environmental parameters to an action in an action space. The agent policy $\Pi$ may be a deep neural network (e.g. modelled by a deep neural network) and the weights of the deep neural network may be learned using a reinforcement learning algorithm. In order to interact with the environment, the RL agent receives data characterizing the current state of the environment and the sampled environmental parameter and the agent policy $\Pi$ generates an action from an action space in accordance with the current state and the sampled environmental parameter. The generated action causes the RL agent to interact with the environment.

In example embodiments, the environment is a simulated environment and the RL agent is a simulated RL agent interacting with a simulated environment.

The simulated environment may for example include a mechanical device (e.g., a robot or vehicle) controlled by the RL agent, and a surrounding environment that the mechanical agent operates within. Each of the simulated RL agent and the simulated environment may be implemented as one or more computer programs running on one or more processing systems.

Figure 1:
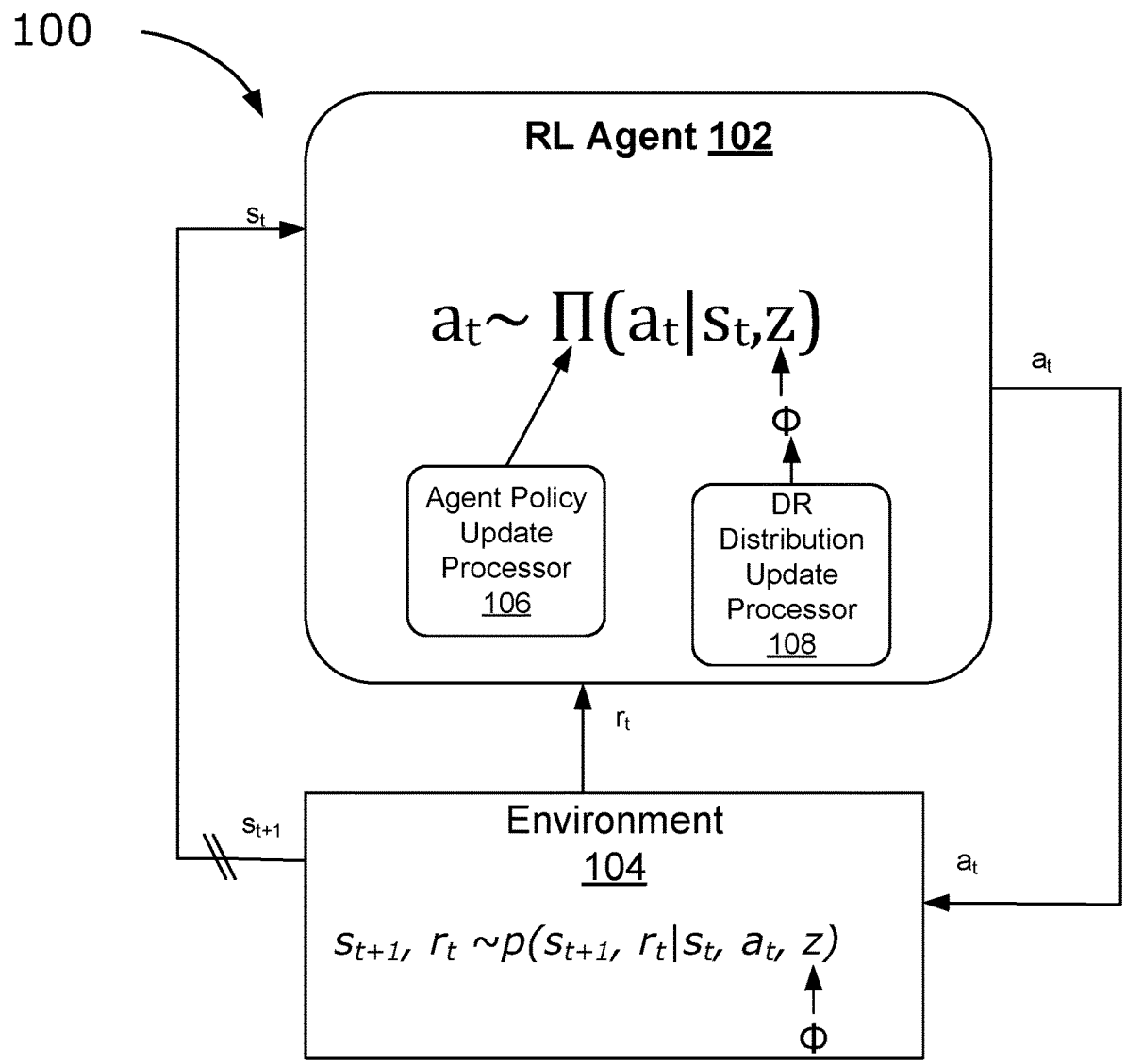
FIG. 1 is a schematic diagram illustrating an RL system in accordance with one example embodiment.

FIG. 1 shows an example RL simulator system 100 that includes a simulated RL agent 102 and a simulated environment 104. The simulated RL agent 102 and simulated environment 104 may in example embodiments be implemented as computer programs on one or more computers in one or more locations in which the systems, components, and techniques described below are implemented. In some examples, different components or functions of the RL agent 102 and simulated environment 104 may be implemented using different virtual machines on the same computer. In example simulation embodiments, the simulated environment 104 may also be implemented by one or more computer programs on one or more computers in one or more locations.

RL agent 102 is configured to generate an action $a_t$ based on an observed state $s_t$ and an environmental parameter z, which has been sampled from a DR distribution $\phi$. In particular, RL agent applies agent policy $\Pi$ to map the observed state $s_t$ and environmental parameter z to an action $a_t$. Each action $a_t$ may be one action sampled from a space of possible actions (action space A) that may be performed in the environment 104. In some examples, the simulated RL agent 102 may simulate a controller, including for example a robot controller interacting within the environment 104 to accomplish a specific task. The simulated environment 104 simulates the effect of an action $a_t$ in an environment, resulting in synthetic data that is output as an observed state $s_{t+1}$. In example embodiments, the simulated environment 104 applies a function p that: (a) maps the current observed state $s_t$, the action $a_t$ and the environmental parameter z to a respective resulting observed state $s_{t+1}$; and (b) maps the current observed state $s_t$, the action $a_t$ and the environmental parameter z to a reward $r_t$. In some examples, the observed state $s_{t+1}$ generated by the simulated environment 104 may include attributes of a mechanical device (e.g., the robot that is being controlled) and its surrounding environment. In some examples, the robot may be an autonomous or semi-autonomous vehicle, and, the RL agent 102 may be an autonomous or semi-autonomous vehicle controller, and the observed state $s_{t+1}$ generated by simulated environment 104 includes attributes about the vehicle that is being controlled and the surrounding environment the vehicle interacts with. In these implementations, the actions $a_t$ may be sampled from the action space A that includes control inputs to control the robot or the autonomous vehicle. By way of example, in the context of RL agent 102 that is being trained as an anonymous or semi-autonomous vehicle controller, actions $a_t$ may include control inputs regarding steering, throttling and braking, among other things.

In the context of simulating a vehicle, the attributes that make up observed state $s_t$ may include points within an observable state space S such as: wheel speed; steering angle; brake torque; wheel torque; linear and angular velocity; linear and angular acceleration, and vehicle pose, among other things.

As noted above, environmental parameter z may be sampled (e.g. selected) from DR distribution $\phi$. Environmental parameter z may be a tensor that includes values that each describe a different type of parameter. In examples embodiments, each of the environmental parameter types may be types of parameters that are not directly impacted by actions $a_t$. For example, in the case of a vehicle, environmental parameter z may include elements that specify vehicle mass, vehicle dimensions; vehicle wheel size; wheel/road surface friction; ambient temperature; and lighting conditions (night/day).

DR distribution $\phi$ includes a respective DR distribution $\phi_i$ for each type of environmental parameter. In example embodiments, each DR distribution t is defined by a respective set of distribution parameters. For example, in the case of a uniform distribution, a pair of distribution parameters, namely first and second values that respectively define a minimum value and a maximum value, can be used to define the DR distribution $\phi_i$. In the case of a Gaussian DR distribution, a distribution parameters may include a value that indicates the highest occurring value and a value that indicates standard deviation. Accordingly, as used herein, learning a DR distribution $\phi$ refers to learning the distribution parameters that define the respective DR distributions $\phi_{i(s)}$ for each of the environmental parameter types included in an environmental parameter z.

In the context of an RL simulator system 100 for training an RL agent 102 to implement a robot controller, examples of environmental parameter types may for example include environmental parameters that specify the following: friction (e.g., friction at an interface surface between a member of the robot and an external environmental element that the robot interacts with; in such case the friction DR distribution may be a uniform distribution defined by a minimum friction value and a maximum friction value), density (e.g., a density of the robot; in such case the density DR distribution may be a uniform distribution defined by minimum and maximum density values), torso size (e.g., mass of the robot; in such case the torso size DR distribution may be a uniform distribution defined by a minimum and maximum torso mass values) and joint damping (e.g. damping force at a joint of robot, in such case the joint damping DR distribution may be a uniform distribution defined by minimum and maximum joint damping values). Having a distribution over such environmental parameters will help with robustness of the policy of the RL agent 102 learned in simulation against the variations that exist in real world.

In some cases, the observed state $s_t$ of the environment 104 is represented using a low-dimensional feature tensor, such as a feature vector. In this disclosure, a feature tensor refers to a set of multiples scaler values or parameters, with parameter quantifying a respective characteristic or attribute of the environment. The number of attributes represented in a feature tensor each correspond to a different dimension. In these cases, values of different dimensions (e.g., different characteristics) of a low-dimensional feature tensor may have varying ranges.

In some examples, the observed state $s_t$ is represented using a high-dimensional feature tensor, for example sets of image pixel inputs from one or more images that characterize the environment, e.g., images of the simulated environment or images captured by environmental sensor of the mechanical device as it interacts with the real-world environment. In some examples, one or more intermediate processing functions may be used to embed features present in one or morehigher dimensional feature tensors into lower dimensional feature tensors to reduce the size of the feature tensors processed by the RL agent 102.

In example embodiments, the RL agent 102 that is trained as a controller for a simulated mechanical device such as a simulated robot may be used as a controller for a real mechanical device such an a real robot. As noted above, a reality gap may occur during the transition from simulated environment to a real environment, DR distribution provides an approach to mitigating this reality gap by training a RL agent to maximize performance of the RL agent in simulation over a diverse set of simulation scenarios, where the environmental parameter z of each scenario is sampled randomly. The distribution parameters for DR distribution P should be selected so that the agent policy Π learned by the simulated RL agent 102 in simulation is not overly dependent on the environmental parameter z experienced in simulated environment 104, but rather DR based training should enable the trained RL agent 102 to function over different real world environments.

Accordingly, this present disclosure is directed to methods and systems that enable DR distribution $\phi$ to be learned concurrently with agent policy Π such that a real robot experience is represented in the observed state. Example aspects describe a RL simulator system 100 that in at least some applications can be used to train a RL agent 102 on a wide distribution of an environment parameter, which can help with robustness of the RL agent 102 as well as with the transfer of learning for the RL agent 102 between simulated environment 104 and real environments. In example embodiments, the RL agent 102 may be a fixed capacity RL agent, meaning that the RL agent has a capacity to select actions from a defined action space based on an observed state that falls within a defined space and environmental parameter that falls within a DR distribution.

Accordingly, in example embodiments RL simulator system 100 enables a DR distribution $\phi$ to be learned that provides a range of simulated environmental parameters such that an agent policy H of the RL agent 102 is simultaneously learned over the widest range of possible simulated environmental parameters over which the RL agent 102 can plausibly be successfully used in the real world. One goal of making the DR distribution 0 of simulated environmental parameter z as wide as possible is to encode the largest set of state-action behaviours that are possible for a single RL agent 102 that has a fixed capacity. In example embodiments, the RL simulator system 100 is configured to apply an optimization process that focuses on a range of simulated environmental parameters within which the RL agent 102 will feasibly operate.

In this regard, RL simulator system 100 is configured to learn a DR distribution $\phi$ from which an environmental parameter z can be sampled, while concurrently learning an agent policy Π to maximize performance of the RL agent 102 over the range of the learned DR distribution ϕ of environmental parameters z. The RL simulator system 100 is configured to operate over a wide range of possible simulated environmental parameters, enabling a context-aware agent policy Π to be learned that can receive as input the current state of the environment that is conditioned by contextual information describing the sampled environmental parameters of the simulator. This may enable the RL agent 102 to learn a context-specific policy that considers the current dynamics of the environment, rather than an average over all possible simulated environmental parameters.

RL Agent 102 observes the simulated environment 104 by receiving data characterizing the observed state $s_t$ generated by simulated environment 104. RL agent 102 applies agent policy Π to map observed state $s_t$, and sampled environmental parameter z, select an action $a_t$ from an action space A for performance in the simulated environment 104. In an example embodiment, the simulated environment 104 of RL simulation system 102 implements function p that generates both a subsequent observed state $s_{t+1}$ and a reward $r_t$, based on the observed state $s_t$, the action $a_t$, and the environmental parameter z sampled from DR distribution ϕ. In example embodiments, the agent policy Π is implemented using one or more neural networks configured by a respective set of trainable network parameters. In example embodiments, once the agent policy Π is trained using RL simulator system 100, the trained agent policy Π can be used as a controller in a real world environment, for example to control a robot. In some examples, simulated environment may also be implemented using a trainable neural network.

In example embodiments, the training of RL simulator system 100 is based on parametric Markov Decision Processes (MDPs). An MDP M is defined by a tuple (S, A, p, r, γ, ρ0), where: S is the set of possible states, and A is the set of actions, p:S×A×S→R, encodes the state transition dynamics, r:S×A→R is the task-dependent reward function, y is a discount factor, and ρ0:S→R is the initial state distribution. In the present disclosure, $s_t$ and $a_t$ are the state and action taken at time t. In example embodiments, RL simulator system 100 operates over a defined number (N) of training iterations, or until a desired performance of the RL agent 102 is achieved. During each training iteration, a forward propagation action is repeated over successive times (t, t+1 etc.) until a buffer B is filled with transition tuples of (state, environmental parameter, action, reward for after taking the action, and next state). The filling of buffer B may occur over multiple episodes, with each episode commencing with an initial state and ending when a terminal state is reached. At the end of each training iteration, the DR distribution of environmental parameters ϕ and the weights of the deep neural network that models the agent policy Π are each updated.

At the beginning of each episode, an initial observed state $s_o$ is randomly sampled from an initial space distribution ρ0(.) (e.g., $s_o$~ρ0(.)). Trajectories T (e.g., entries to build tupple (S, A, p, r, γ, ρ0) that represents MPD M) are obtained by iteratively sampling actions $a_t$ using the current policy, Π, (e.g., $a_t$~Π ($a_t$|$s_t$,z) and evaluating next states according to the transition dynamics $s_{t+1}$~p($s_{t+1}$|$s_t$, $a_t$, z), where the environmental parameter z is parameters of the dynamics. Given an MDP M, policy ε is learned to maximize an expected sum of rewards $J_M(\Pi) = E_T R(T)|\Pi = E_T \Sigma_{t=0}^{\infty}$ where $r_t = r(s_t, a_t)$.

RL simulator system 100 aims to maximize performance over a distribution of MDPs, each described by a context vector z (e.g. simulate environmental parameter z) representing the variables that change over the distribution. The objective of training RL simulator system 100 is to maximize $E_{z\sim p(z)}[J_{Mz}(\Pi)]$ [JMz (Π)], where p(z) is the domain randomization distribution.

Figure 2:
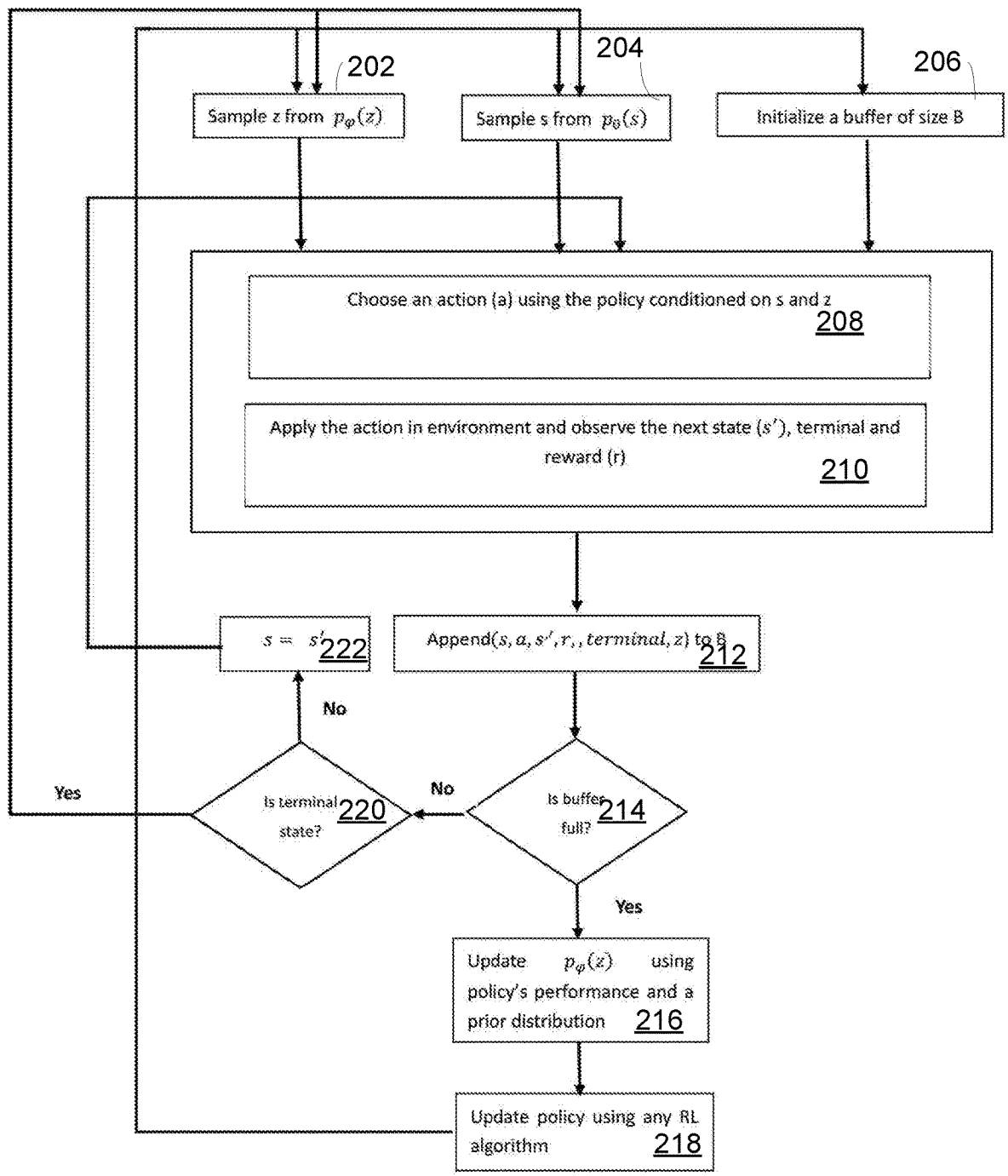
FIG. 2 is a block diagram of a method of training an RL agent of the RL system of FIG. 1, in accordance with one example embodiment.

FIG. 2 represents of a method 200 of simultaneously learning the DR distribution of environmental parameters ϕ of simulated environment 104 and an agent policy Π of RL agent 102, according to an example embodiment. FIGS. 3A and 3B shows a pseudo-code representation of an algorithm that can be implemented by a processor system to perform the method of FIG. 2. In example embodiments, the RL simulator system 100 is configured to apply an algorithm, referred to herein for convenience as the "Sweet-spot Distribution Range" (LSDR) algorithm, which simultaneous learns DR distribution of environmental parameters ϕ and an agent policy n that optimized performance of the RL simulator system 100 (i.e. maximizes a cumulative reward) over the DR distribution ϕ of environmental parameter z. Learning the DR distribution ϕ comprises learning distribution parameters (e.g., min amd max in the case of a uniform distribution) that: encourage a wider range for the DR distribution ϕ while considering the agent policy n performance in that range.

In this regard, example embodiments include the following steps:

Step 1:
 a. Block 202: An environmental parameter z (which may include a set of parameters of different parameter types) is sampled from a parameterized DR distribution $p_\varphi(z)$. Examples of environmental parameter types included in environmental parameter z may for example include density and friction for a robotic task, as well as parameters of dynamic state of an autonomous vehicle; and for image recognition applications may include color and texture features or lighting conditions which can be set in some simulator for different vision data quality and variation.
 b. Block 204: An initial observed state s is sampled from initial state space $p_0(s)$. st is the observed state which agent policy Π uses for decision making.
 c. Block 206: A memory is initialized with a buffer size B.

Step 2:
Blocks 208 to 222: The agent policy n, conditioned by environmental state $s_t$ and environmental parameters z, is used to select an action a(t) (Block 802); the action $a_t$, environment state $s_t$, and environmental parameter z are mapped by a function to a next observed state $s_{t+1}$ and a reward r (Block 210), resulting in trajectories (Block 212) that are collected until the buffer size B is filled (Block 214) or a terminal state occurs (Block 220). If a terminal state occurs, the environmental simulator parameters are resampled (Block 222) and the process (Blocks 202 to 220) continues until the maximum buffer size B is reached (e.g. until a predetermined amount of trajectory data is collected).

Step 3: Block 216: The DR distribution ϕ is updated by a DR distribution update processor 106 using the objective function defined as below:

$$\underset{\phi}{\mathrm{argmax}} \mathcal{L}_{DR}(\phi) - \alpha D_{KL}(p\phi(z)\|p(z))$$

This is just an example of the possible objective. The first term accounts for the agent policy Π performance within the DR distribution (and thus narrows the distribution range for DR distribution ϕ) while the second term operates to encourage the DR distribution ϕ to be wider.

Step 4: (Block 218) The agent policy Π is updated using known reinforcement learning techniques. This update can be done with reference to the parameters z or without it. In example embodiments, the agent policy Π is a neural network whose weights are updated by an agent policy update processor 106. The agent policy update processor 108 runs (e.g. executes) an RL algorithm that generates updates for the weights based on a transition tuple of state, environmental parameter, action, reward of the agent policy after taking the action, and the next state.

Step 5: The process is repeated for N iterations or until a predetermined performance threshold is achieved.

Although the above examples have been described in the context of a simulator system, aspects of the present disclosure can be provided other types of learning agents that are trained using synthesized data and then transferred to real world applications or another simulated environments.

Figure 4:
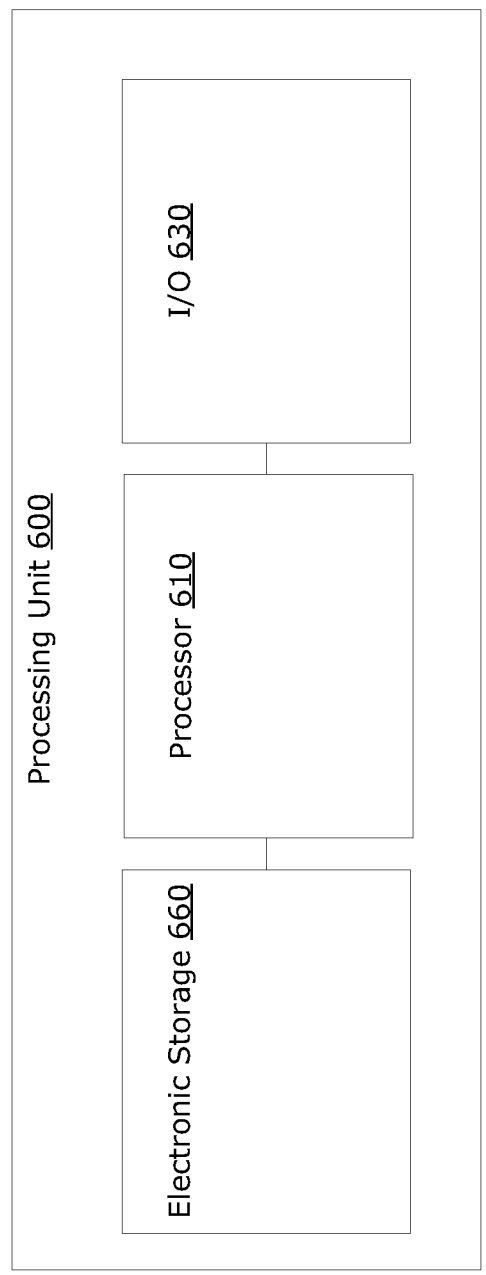
FIG. 4 is a block diagram of processing system in accordance with one example embodiment of the present disclosure.

FIG. 4 illustrates an example of a processing unit 600 that may be used to implement one or more of the components of RL simulator system 100, including RL agent 102, simulated environment 104, agent policy update processor 106 and DR distribution update processor 108. Processing unit 600 may also be used to implement a trained agent policy π that incorporates the optimized actor parameters determined by RL system 100. The processing unit 600 may be implemented in a vehicle or robot in some examples. The processing unit 600 may also be external to a vehicle or robot, for example in order to generate optimized agent and critic parameters for training and/or testing outside of a real-world environment.

In this example, the processing unit 600 includes one or more physical processors 610 (e.g., a microprocessor, graphical processing unit, digital signal processor or other computational element) coupled to an electronic storage 620 and to one or more input and output interfaces or devices 630. The electronic storage 620 can include tangible memory (for example flash memory) and transient memory (for example RAM). The tangible memory(ies) may store instructions, data and/or software modules for execution by the processor(s) to carry out the examples described herein. The electronic storage 620 may include any suitable volatile and/or non-volatile storage and retrieval device(s). The electronic storage 620 may include one or more of random access memory (RAM), read only memory (ROM), hard disk, optical disc, subscriber identity module (SIM) card, memory stick, secure digital (SD) memory card, and the like.

In the example of FIG. 6, computer instructions and data are stored in electronic storage 620 of processing unit 600 that enable the processer 610 to implement the neural networks and other functions of RL simulator system 100 disclosed herein.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as a memory of a vehicle control system or a memory of a neural network controller (not shown). The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of learning an agent policy using reinforcement learning, comprising:
    performing a set of training iterations, each iteration comprising:
        generating a set of tuples, the generating of each tuple comprising:
            sampling a domain randomization (DR) distribution to select an environmental parameter;
            mapping, using the agent policy, a current observed state and the environmental parameter to a current action; and
            mapping, using a function, the current action, current observed state and the environmental parameter to a next observed state and a reward, wherein the next observed state is used as the current observed state for generating the next tuple in the set of tuples,
        updating the DR distribution and the agent policy, based the set of tuples, with an objective of increasing rewards in future iterations.

2. The method of claim 1 wherein the training iterations are repeated until the earlier of a defined number of training iterations have been performed or the rewards indicate an optimized agent policy and DR distribution have been reached.

3. The method of claim 1 wherein each tuple in the set of tuples includes: the current observed state, the environmental parameter, the current action, the reward, and the next observed state.

4. The method of claim 1 wherein in each training iteration, generating a set of tuples is performed until a predetermined tuple buffer size is reached.

5. The method of claim 1 wherein the DR distribution is defined by distribution parameters, and updating the DR distribution comprises updating the distribution parameters.

6. The method of claim 5 wherein the environmental parameter is a tensor that includes values for a plurality of different parameter types, the DR distribution includes a respective parameter type DR distribution for each of the different parameter types, each parameter type DR distribution being defined by a respective set of distribution parameters.

7. The method of claim 6 wherein at least one of the parameter type DR distributions is a uniform distribution defined by a respective set of distribution parameters that include a minimum value and a maximum value for the uniform distribution.

8. The method of claim 1 wherein the agent policy is implemented by a neural network, and updating the agent policy comprises updating weights applied by the neural network.

9. The method of claim 1 comprising using the agent policy, after the training iterations, to implement a real-world controller for a robot.

10. A reinforcement learning (RL) simulator system comprising one or more processing units configured by computer program instructions to simulate an RL agent that is configured to apply an agent policy to map a current observed state and an environmental parameter to a current action, and a simulated environment configured to apply a simulated environment function to map the current action, the current observed state and the environmental parameter to a next observed state and a reward,
wherein the computer program instructions configure the one or more processing units to collectively:
perform a set of training iterations, each iteration comprising:
generating a set of tuples, the generating of each tuple comprising:
sampling a domain randomization (DR) distribution to select an environmental parameter;
mapping, using the agent policy, a current observed state and the environmental parameter to a current action; and
mapping, using the simulated environment function, the current action, current observed state and the environmental parameter to a next observed state and a reward, wherein the next observed state is used as the current observed state for generating the next tuple in the set of tuples,
updating the DR distribution and the agent policy, based the set of tuples, with an objective of increasing rewards in future iterations.

11. The system of claim 10 wherein the training iterations are repeated until the earlier of a defined number of training iterations have been performed or the rewards indicate an optimized agent policy and DR distribution have been reached.

12. The system of claim 11 wherein each tuple in the set of tuples includes: the current observed state, the environmental parameter, the current action, the reward, and the next observed state.

13. The system of claim 10 wherein in each training iteration, generating a set of tuples is performed until a predetermined tuple buffer size is reached.

14. The system of claim 13 wherein the DR distribution is defined by distribution parameters, and updating the DR distribution comprises updating the distribution parameters.

15. The system of claim 1 wherein the environmental parameter is a tensor that includes values for a plurality of different parameter types, the DR distribution includes a respective parameter type DR distribution for each of the different parameter types, each parameter type DR distribution being defined by a respective set of distribution parameters.

16. The system of claim 15 wherein at least one of the parameter type DR distributions is a uniform distribution defined by a respective set of distribution parameters that include a minimum value and a maximum value for the uniform distribution.

17. The system of claim 10 wherein the agent policy is implemented by a neural network, and updating the agent policy comprises updating weights applied by the neural network.

18. The system of claim 10 comprising using the agent policy, after the training iterations, to implement a real-world controller for a robot.

19. A computer program product comprising a non-transitory storage medium storing computer program instructions that, when executed by a processor, configure the processor to:
perform a set of training iterations, each iteration comprising:
generating a set of tuples, the generating of each tuple comprising:
sampling a domain randomization (DR) distribution to select an environmental parameter;
mapping, using an agent policy, a current observed state and the environmental parameter to a current action; and
mapping, using a function, the current action, current observed state and the environmental parameter to a next observed state and a reward, wherein the next observed state is used as the current observed state for generating the next tuple in the set of tuples,
updating the DR distribution and the agent policy, based the set of tuples, with an objective of increasing rewards in future iterations.

* * * * *

UNITED STATES PATENT AND TRADEMARK OFFICE
CERTIFICATE OF CORRECTION

PATENT NO. : 11,501,167 B2
APPLICATION NO. : 16/890981
DATED : November 15, 2022
INVENTOR(S) : Camilo Gamboa Higuera et al.

It is certified that error appears in the above-identified patent and that said Letters Patent is hereby corrected as shown below:

In the Specification

Column 5, Line 29: "each DR distribution t is defined" should read -- each DR distribution $\Phi_i$ is defined --

Column 6, Lines 27-28: "The distribution parameters for DR distribution P should be" should read -- The distribution parameters for DR distribution $\Phi$ should be --

Column 6, Lines 51-52: "simulated environmental parameters such that an agent policy H of the RL agent 102" should read -- simulated environmental parameters such that an agent policy $\Pi$ of the RL agent 102 --

Column 6, Lines 55-57: "One goal of making the DR distribution 0 of simulated environmental" should read -- One goal of making the DR distribution $\Phi$ of simulated environmental --

Column 7, Line 38: "y is a discount factor" should read -- $\gamma$ is a discount factor --

Column 7, Lines 62-64: "Given an MDP M, policy $\varepsilon$ is learned to maximize an expected sum of rewards $J_M(\Pi) = E_T R(T)|\Pi = E_T \sum_{t=0} \infty$ where $r_t = r(s_t, a_t)$." should read -- Given an MDP M, policy $\Pi$ is learned to maximize an expected sum of rewards $J_M(\Pi) = E_T R(T)|\Pi = E_T \sum_{t=0}^{\infty} \gamma^t r_t$, where $r_t = r(s_t, a_t)$. --

Column 8, Line 16: "agent policy n that optimized performance" should read -- agent policy $\pi$ that optimized performance --

Column 8, Line 23: "considering the agent policy n" should read -- considering the agent policy $\pi$ --

Signed and Sealed this
Fourth Day of March, 2025

Coke Morgan Stewart
*Acting Director of the United States Patent and Trademark Office*

Column 8, Line 44: "The agent policy n" should read -- The agent policy $\pi$" --

Column 9, Line 28: "policy n that incorporates" should read -- policy $\pi$ that incorporates --